Sept. 9, 1941.　　　E. G. ROBINSON　　　2,255,438
MATERIAL HANDLING APPARATUS
Filed June 3, 1939　　　5 Sheets-Sheet 1

INVENTOR.
Evelyn G. Robinson
BY Williams, Rich & Morse
ATTORNEYS

Sept. 9, 1941.   E. G. ROBINSON   2,255,438
MATERIAL HANDLING APPARATUS
Filed June 3, 1939   5 Sheets-Sheet 2

INVENTOR.
Evelyn G. Robinson
BY Williams, Rich & Morse
ATTORNEYS

Sept. 9, 1941.  E. G. ROBINSON  2,255,438
MATERIAL HANDLING APPARATUS
Filed June 3, 1939 5 Sheets-Sheet 3

INVENTOR.
BY Evelyn G. Robinson
Williams, Rich & Morse
ATTORNEYS

Patented Sept. 9, 1941

2,255,438

UNITED STATES PATENT OFFICE 2,255,438

MATERIAL HANDLING APPARATUS

Evelyn G. Robinson, New York, N. Y.

Application June 3, 1939, Serial No. 277,231

11 Claims. (Cl. 302—53)

This invention relates to material-handling apparatus adapted to be employed in the pneumatic handling of various materials of granular, flocculent, pulverulent or similar nature.

An important object of the present invention is to provide an apparatus for use in the pneumatic handling of various materials which is simple in construction and which in operation is highly efficient not only with respect to the removal of the main bulk of material to be conveyed but also with respect to the removal of any relatively small amount of material remaining in the receptacle after the major portion of the original bulk of such material has been removed.

A further object of the invention is to provide, in an apparatus of the above character, for the uniform delivery of air to the material in such a manner as to effectively condition the material for pneumatic removal from the receptacle and to guard against any undue impedance to the delivery of such air.

Other objects and advantages of the invention will become apparent from the following description, when taken in connection with the accompanying drawings, in which—

Figure 1:
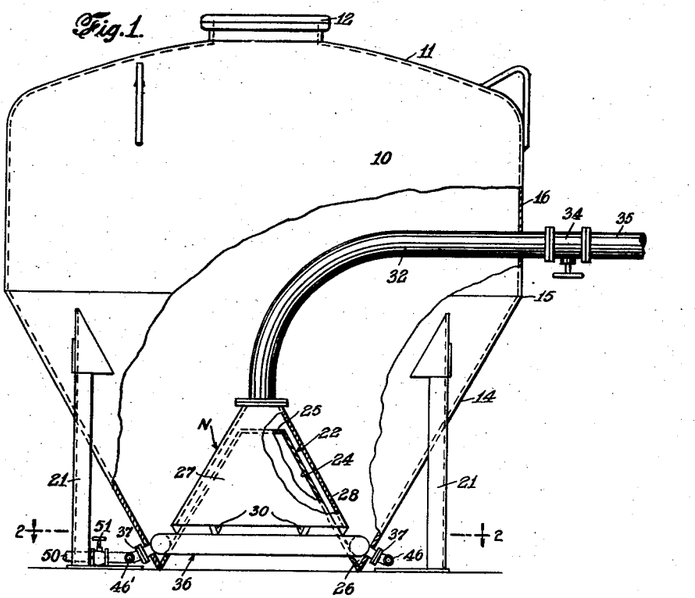
Fig. 1 is a view in elevation of an apparatus embodying the present invention.

Although the invention is adapted for use in connection with various forms of receptacles or containers, it is herein illustrated in association with a container 10 particularly designed for use in the railway transportation of various materials, notably cement, in less than carload lots. The container 10 is preferably cylindrical at its upper end and is there provided with a dome-like header 11 having a filling opening, not shown, with which is associated a closure 12 adapted to be clamped or otherwise held in sealed position so as to guard against the escape of air by way of the filling opening during the unloading operation. As shown most clearly in Fig. 1, the lower portion of the container 10 is so shaped that its wall 14, which is inclined at an angle of 60° to the horizontal, presents an inverted frustum of a cone, the wall 14 being suitably connected, as shown at 15, to the upper cylindrical wall 16 of the container. In order that the container 10 may be adequately supported when at rest on a flat surface, there is provided a rectangular base 17, the outer frame members 18 of which are suitably connected together at their opposite ends. To the corners of the base 17 there are connected a plurality of inwardly extending frame members 20 which are connected at their inner ends to the lower end of the container, the frame 17 being provided at its corners with upwardly extending post-like frame members 21 which are suitably connected to the inclined wall 14 of the container 10.

To the lower end of the inclined wall 14 there is suitably connected a bottom-forming unit 22 which is so shaped that it presents a frustum of a cone, the side wall 24 of the bottom-forming unit being inclined at an angle of 60° to the horizontal and the upper end of that unit being closed by a disc-like header 25. Inasmuch as the inclined wall 14 of the container 10 and the inclined wall 24 of the bottom-forming unit 22 form, respectively, with the horizontal an angle of 60°, it follows that these walls are disposed at an angle of 60° to each other and form with each other at the lower end of the container an annular V-shaped material-receiving channel 26 into which the material carried within the container 10 and to be pneumatically removed therefrom flows during the unloading operation.

Within the container 10 there is arranged a hood-like cowl 27 which substantially envelopes the bottom-forming unit 22. As to the cowl 27, it will be observed that its wall 28, which is inclined at an angle of 60° to the horizontal, presents an inverted frustum of a cone, the wall 28 being disposed in a parallel relation to, and spaced from, the inclined wall 24 of the bottom-forming unit 22. As shown most clearly in Fig. 1, the wall 28 of the cowl 27 is maintained in a definite spaced relation to the wall 24 of the bottom-forming unit 22 by a plurality of spacing lugs 30 interposed between the two walls and suitably secured thereto. From the foregoing, it will be understood that the cowl 27 and the bottom-forming unit 22 are so cooperatively related that they constitute a pick-up nozzle, indicated generally by the reference character N, such nozzle being characterized by the fact that the wall 28 of the cowl 27 forms with the wall 24 of the bottom-forming unit 22 an annular ejector passage 31 which communicates, at its lower end, directly with the container 10 along a horizontal plane in close proximity to the apex of the V-shaped channel 26 so as to facilitate complete removal of material from the container in a manner to be hereinafter more particularly described. As shown most clearly in Fig. 1, the upper end of the cowl 27 is suitably connected to and is adapted to communicate with a discharge conduit 32, the outer end of which projects through and is suitably connected to the side walls 16 of the container. In order to prevent escape of air and material from the container 10, incident to introducing air pressure into the tank preparatory to initiating the material-removing operation, the conduit 32 is provided at its outer end with a suitable valve 34 to which may be connected a delivery conduit 35 leading to any relatively remote point at which it is desired to deliver the material from the container.

Figure 2:
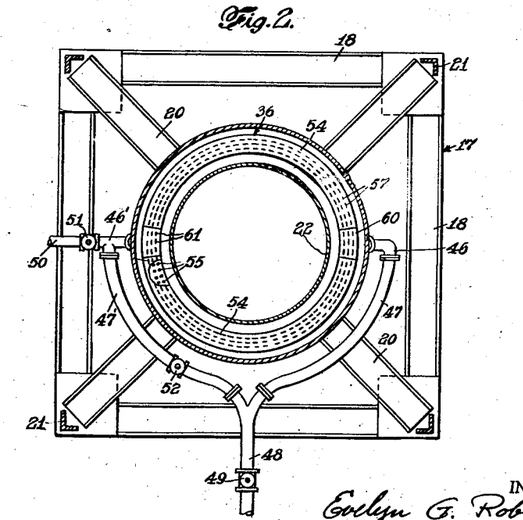
Fig. 2 is a horizontal, sectional view taken on the line 2—2 of Fig. 1.
Figure 3:
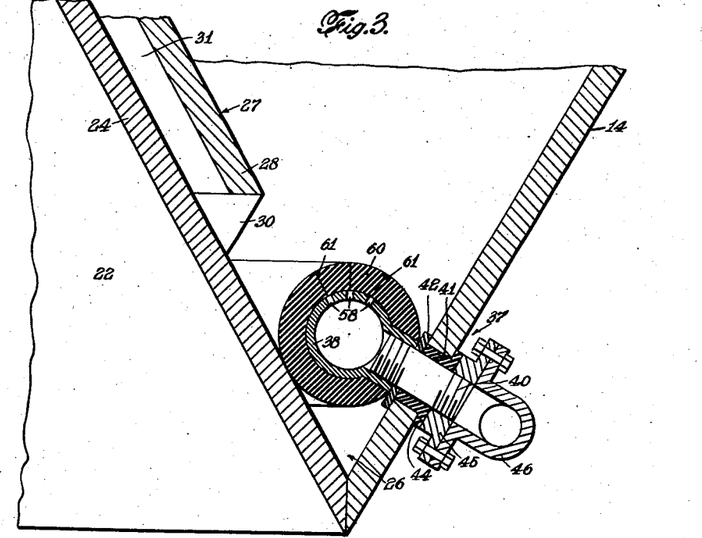
Fig. 3 is an enlarged, fragmental, sectional view showing certain details of construction peculiar to the air distributing unit of Figs. 1 and 2.
Figure 4:
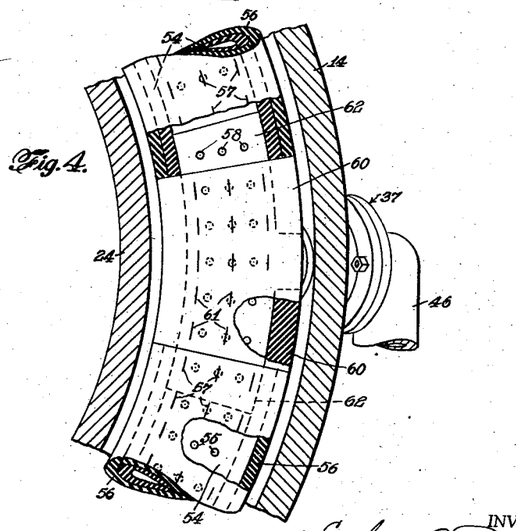
Fig. 4 is a fragmental, horizontal, sectional view taken on line 4—4 of Fig. 3.

Some materials, such as dry or powdered cement, have a tendency to pack into a highly compact mass when subjected, for example, to a jarring action such as is effected incident to railway transportation; and with this in mind, means are herein provided for loosening such material by aeration, so that the pick-up nozzle N may operate to efficiently effect removal of the material from the container 10. The form of aerating means shown in Figs. 1 to 4 inclusive includes an annular distributor unit 36 which is accommodated by and snugly fits within the lower portion of the V-shaped channel 26. The distributor unit 36 comprises a pair of coupling units 37, each of which includes a relatively short pipe-like fitting 38 to which is connected at right angles thereto a relatively short inlet pipe 40, passing through an opening 41 formed in the inclined wall 14 of the container 10 relatively near the apex of the V-shaped channel 26. In order that an air-tight jointure may be formed between the coupling unit 37 and the inclined wall 14 of the container 10, such fitting may be equipped with a gasket 42, surrounding the inlet pipe 40, and further equipped with a packing sleeve 44 disposed within the opening 41 and also surrounding the inlet pipe 40, the gasket 42 and the packing sleeve 44 being held in their respective sealing positions shown in Fig. 3 by a flange nut 45 carried by the inlet pipe at the outer end thereof. The flange nuts 45 are adapted to receive in bolted union therewith pipe fittings 46 and 46' to which are connected branch pipes 47 and 47' of an air-pressure supply pipe 48 equipped with a valve 49 and adapted to be connected to an air compressor, not shown, or other source of pressure supply. For purposes hereinafter more particularly described, the pipe fitting 46' is provided with a blow-out pipe 50 which may be opened and closed by a valve 51 associated therewith and adapted, as hereinafter explained, to cooperate with a similar valve 52 disposed in the branch pipe 47'. As shown most clearly in Figs. 2, 3 and 4, the distributor unit 36 also includes a pair of arcuate tubes 54 which are so connected to the opposite ends of the pipe-like fittings 38 that such tubes and such fittings collectively constitute an endless annular conduit, which, throughout its uninterrupted length, snugly fits within the V-shaped channel 26 and occupies a position in such channel relatively near the apex thereof. In accordance with the present invention, the tubes 54 are made from suitable material, such as is commonly employed in high-pressure airline hose. The hose elements which form the basic structure of the tubes 54 are rendered admirably suited for use in the distributor unit 36 by forming in their walls, reference being had to Figs. 1 to 4, a multiplicity of apertures 55, and then covering such hose elements with sheaths 56 (of elastic material, such as relatively soft rubber) which are provided with slits 57 in registration with the respective apertures. The slits 57, due to the inherent characteristics of the rubber from which the sheaths 56 are formed, are maintained closed except in the presence of substantial internal pressure within the distributor unit 36, but are capable of so opening under the influence of such pressure as to permit the escape of sufficient air under pressure to aerate the material within the container 10 and pneumatically effect discharge of such material by way of the pick-up nozzle N. In order that aeration of the material may be effected throughout the uninterrupted length of the annular distributor unit 36, the metal pipe fitting 38 of each coupling unit 37 is provided in its upper face, reference being had to Figs. 1 to 4, with a plurality of apertures 58 and each fitting is provided with a sheath 60, of relatively soft rubber, having slits 61 formed therein and adapted to function in the manner of the slits 57. Each sheath 60 extends throughout the length of its associated fitting 38 except for the opposite end portions 62 of such fitting to which the tubes 54 are secured in an embracing relation. Regarding particularly the end portions 62 of the fittings 38, it will be observed that their apertures 58 register with such apertures 55 of the tubes 54 as are peculiar to the tubes where they embrace the fittings 38.

The modified form of invention shown in Figs. 5 and 6 differs from the structure described in connection with Figs. 1 to 4 in that the annular distributor unit 36' comprises an annular metal ring 64, which is provided with a multiplicity of apertures 65 and is equipped with a ring-like sheath 66 of elastic material, such as relatively soft rubber. The sheath 66, which is suitably secured to the metal ring 64, is folded over the slightly upturned margins 67 of the ring so as to engage, and form an air-tight jointure with, the inner surfaces of the inclined wall 14' of the container 10' and the inclined wall 24' of the bottom-forming unit 22', the line of engagement of the sheath with the latter-mentioned wall being in a horizontal plane located a substantial distance below the lower end of the hood-like cowl 27', which, in association with the bottom-forming unit 22', serves as a pick-up nozzle N' corresponding to and adapted to function in the manner of the pick-up nozzle N, hereinbefore described. In order that the annular ring 64 and its associated sheath 66 may be securely held within the V-shaped material-receiving channel 26', such ring is equipped with a plurality of outwardly and downwardly extending bolts 68 which pass through the inclined wall 14' of the container 10', the bolts being equipped with nuts 70 so that the distributor 36' may be clamped in air and gas-tight union with the inclined walls 14' and 24'. The sheath 66 is provided with a multiplicity of slits 71, which register with the respective apertures 65 formed in the annular ring 64 and are adapted to function in the manner of the slits 57 and 61 already described in connection with the form of invention shown in Figs. 1 to 4. In order that air pressure may be delivered to the lower portion of the V-shaped material-receiving channel 26', which in the present embodiment of the invention serves as an annular conduit peculiar to the distributor unit 36', the container 10' is provided with a pair of pipe fittings 72 and 72' adapted to be connected to an air compressor, not shown, or other source of pressure supply in accordance with the disclosure of Fig. 2, it being understood that with the pipe fitting 72' there may be associated a valve, not shown, corresponding to and functioning in the manner of the valve 51.

Figure 5:
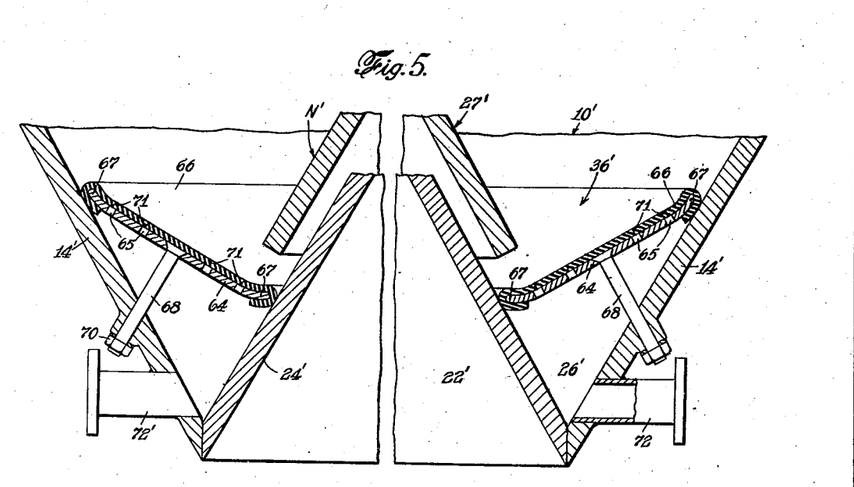
Fig. 5 is a fragmental, sectional view showing a modified form of air distributing unit.
Figure 6:
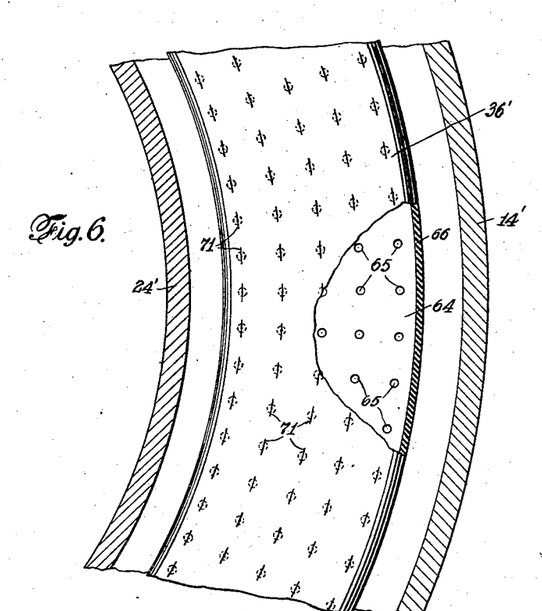
Fig. 6 is a fragmental plan view of a portion of the air distributing unit appearing in Fig. 5, and Figs. 7, 8 and 9 are fragmental, sectional views showing other modified forms of air distributor units.
Figure 7:
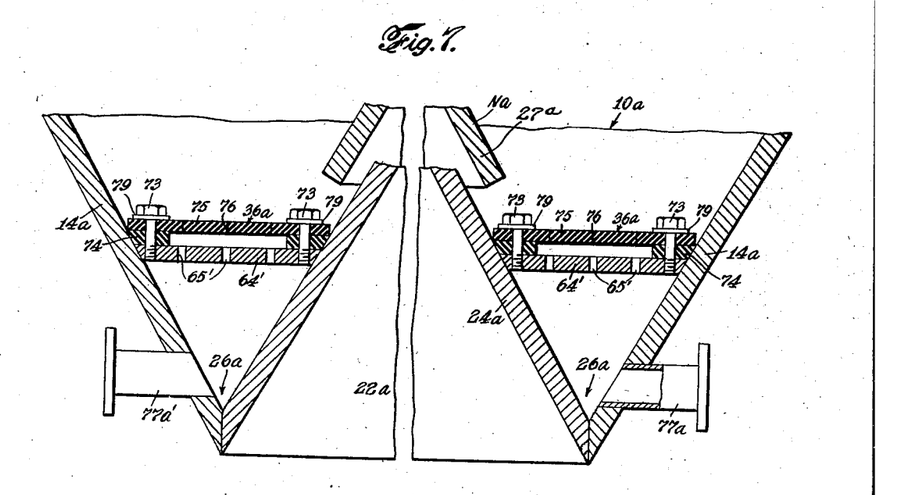

The form of invention shown in Fig. 7 differs from that of Figs. 5 and 6 in that the annular distributor unit 36a comprises an annular metal ring 64', which is provided with a multiplicity of apertures 65', the ring being welded throughout its outer and inner margins to, and thus forming a gas-tight union with, the inclined wall 14a of the container 10a and the inclined wall 24a of the bottom-forming unit 22a. Disposed upon each of the margins of the metal ring 64' is a gasket 74 of suitable material, such as rubber, the gaskets being spaced from each other and carrying thereon, in a normally spaced relation to the metal ring 64', an annular or ring-like distributor element 75 (of elastic material, such as relatively soft rubber) having a multiplicity of slits 76 formed therein and corresponding to the slits 57, 61 and 71 already described in connection with the forms of invention shown in Figs. 1 to 6 inclusive. The gasket 74 and the ring-like distributor element 75 are clamped in their respective positions by a plurality of lag bolts 73 which pass through a pair of compression rings 79 disposed upon the distributor element 75 at its inner and outer margins. In order that air pressure may be delivered to the lower portion of the V-shaped material-receiving channel 26a, which in the present embodiment of the invention serves as an annular conduit peculiar to the distributor unit 36a, the container 10a is provided with a pair of pipe fittings 77a and 77a' adapted to be connected to an air compressor, not shown, or other source of pressure supply in accordance with the disclosure of Fig. 2, it being understood that with the pipe fitting 77a' there may be associated a valve, not shown, corresponding to and functioning in the manner of the valve 51 of Figs. 1 and 2.

The modified form of invention shown in Fig. 8 differs from the structure described in connection with Fig. 7 in that the annular distributor unit 36b comprises mainly an annular distributor element 78 (of elastic material, such as relatively soft rubber) mounted on a pair of annular ledge-like supports 80 which are welded throughout their continuous lengths to, and thus form a gas-tight union with, the inclined wall 14b of the container 10b and the inclined wall 24b of the bottom-forming unit 22b. The distributor element 78 is secured to the ledge-like supports 80 at its inner and outer margins by a plurality of lag bolts 81 which pass through a pair of compression rings 82. The distributor element 78 is provided in its lower face with a multiplicity of pocket-like openings 84 which communicate with a multiplicity of slits 85 corresponding to the slits 57, 61, 71 and 76 described in connection with the forms of invention shown in Figs. 1 to 7 inclusive. In order that air pressure may be delivered to the lower portion of the V-shaped material-receiving channel 26b, which in the present embodiment of the invention serves as an annular conduit peculiar to the distributor unit 36b, the container 10b is provided with a pair of pipe fittings 85b and 85b' adapted to be connected to an air compressor, not shown, or other source of pressure supply in accordance with the disclosure of Fig. 2, it being understood that with the pipe fitting 85b' there may be associated a valve, not shown, corresponding to and functioning in the manner of the valve 51 shown in Figs. 1 and 2.

Figure 8:
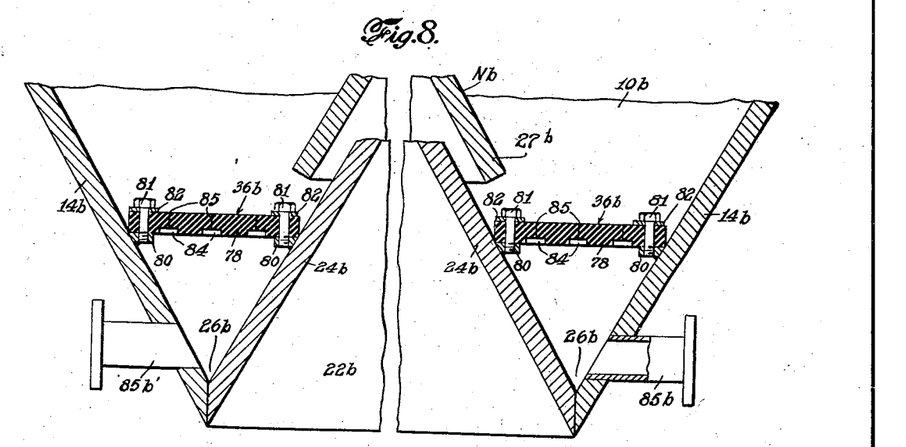
Figure 9:
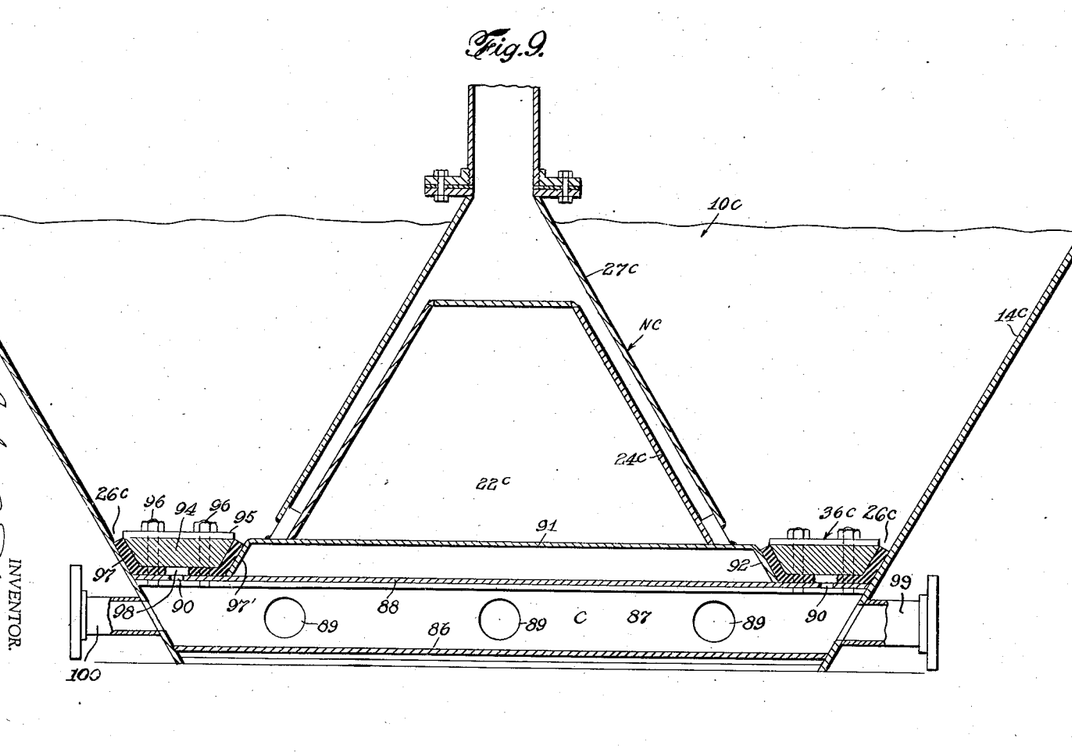

Referring to Fig. 9, wherein another form of the invention is shown, it will be observed that the inclined wall 14c of the container 10c is provided at its lower end with a bottom header 86, on which are arranged a plurality of beams 87 adapted to support a bottom-forming unit 22c which includes a plate 88 having at its margin a series of apertures 90 and forming with the bottom header 86 a pressure-delivery chamber C, communication between all parts of which is insured by reason of the fact that the beams 87 are provided with port-like openings 89. On the plate 88 there is carried a platform 91, which also constitutes an element of the bottom-forming unit 22c and the outer or rim-like margin of which presents an inclined wall 92 forming with the horizontal an angle of 60° which corresponds to the angular inclination of the wall 14c of the container 10c. The bottom-forming unit 22c also includes a pick-up nozzle Nc which is carried on and supported by the platform 91. The pick-up nozzle Nc corresponds to the pick-up nozzles N, N', Na and Nb (Figs. 1, 3 and 5, 7 and 8) and includes the hood-like cowl 27c spaced from the inclined wall 24c of the bottom-forming unit 22c, which inclined wall 24c forms with the inclined wall 14c of the container 10c a material-receiving channel 26c into which the material carried within the container flows during the unloading operation. Within the channel-like space afforded intermediate the inclined wall 14c of the container 10c and the inclined wall 92 of the platform 91 there is disposed a distributor unit 36c which includes an annular ring 94 of a suitable porous material, such material as is known commercially as Filtros. The annular ring 94 may include any desired number of arcuate shaped block-like elements, clamped in an end-to-end relation by suitable means such as clamp plates 95 disposed in an overlying relation to the meeting ends of the blocks and secured to the bottom-forming plate 88 by retaining bolts 96. In order that an air-tight jointure may be afforded between the annular ring 94 and the inclined wall 14c of the container 10c and the inclined wall 92 of the platform 91, suitable packing elements, such as gaskets 97, may be employed as shown, it being observed that the lower ends of such gaskets so support the ring 94 as to afford between that ring and the plate 88 an annular air chamber or conduit 98 which communicates with the pressure-delivery chamber C by way of the apertures 90. In order that air pressure may be delivered to the pressure-delivery chamber C, the container 10c is provided with a pair of pipe fittings 99 and 100 adapted to be connected to an air compressor, not shown, or other source of pressure supply in accordance with the disclosure of Fig. 2.

It is to be observed in connection with the various forms of apparatus herein shown and described that the respective pick-up nozzles N, N', Na, Nb and Nc comprise the respective cowls 27, 27', 27a, 27b and 27c and their respectively associated bottom-forming units 22, 22', 22a, 22b and 22c, the inclined walls 24, 24', 24a, 24b and 24c of which bottom-forming units form with the container walls 14, 14', 14a, 14b and 14c the respective material-receiving channels 26, 26', 26a, 26b and 26c.

The operation of the apparatus shown in Figs. 1 to 4 is as follows:

Assuming that the closure 12 and the valves 34 and 51 are closed, compressed air is introduced, upon opening the valve 49, into the container 10 by way of the supply pipe 48 and its associated branch pipes 47 and 47' until a suitable operating pressure has been built up within the apparatus. During such time as the compressed air is being introduced into the apparatus, it passes into the distributor unit 36 from which it escapes by way of the multiplicity of apertures 55—58 and the respectively associated slits 57 and 61 formed in the rubber sheaths 56 and 60 associated, respectively, with the tubes 54 and pipe-like fittings 38. As the compressed air escapes from the distributor unit 36 it passes up through the material carried within the container 10 and in so doing, the material, such as tightly packed cement in dry or powdered form, is effectively loosened or aerated. After aerating the material, thus conditioning it for removal, and while continuing to introduce compressed air into the container 10, the valve 34 is opened with the result that the material is caused to enter the pick-up nozzle N under the influence of a flowing stream of air entering the pick-up nozzle from the container, the material being carried from the pick-up nozzle and out of the container through the discharge conduit 32 to any desired point or location, as will be readily understood. During the material-handling operation, compressed air is supplied to the container 10 in the manner described, at a sufficient rate to maintain a substantial pressure within the container, with the result that a substantially steady or uniform rate of discharge of the material may be effected throughout the material-handling operation. Due to the fact that the distributor unit 36 is provided with a multiplicity of exit apertures and is located slightly below, and in close proximity to, the inlet of the pick-up nozzle N, I am enabled to effect aeration of the material in the immediate vicinity of such inlet and to also effect such a mixing of the material with the air in that vicinity that the material and the air enter the pick-up nozzle in a commingled condition, with the result that the material is placed in a state of air suspension even prior to the instant it enters the pick-up nozzle, thus promoting efficient and reliable functioning of the device as a material-handling apparatus. As the material is removed from the lower vicinity of the mass, downward movement of the remaining material under the action of gravity is insured due to the relatively steep inclination of the wall 14 of the container 10 and the wall 28 of the cowl 27, which walls serve to guide the material in its downward travel into the immediate vicinity of the inlet to the pick-up nozzle N where it undergoes aeration preparatory to its being pneumatically delivered from the apparatus by way of the delivery conduit 32. Inasmuch as the entire bulk of material moves into the relatively narrow V-shaped channel 26 where it is subjected to aeration in the vicinity of the inlet to the pick-up nozzle N, it follows that complete removal of the material may be effected by the apparatus embodying the present invention. Upon completion of a material-handling operation, the valve 49 is closed with the result that the supply of air to the container 10 is discontinued, whereupon the pressure within such container drops to atmospheric. As the pressure within the container is thus lowered, the slits 57 and 61, formed in the rubber sheaths 56 and 60, close due to the normal tendencies of the rubber (of which the sheaths 56 and 60 are formed) to maintain such slits in closed condition. Thus, it will be appreciated that since the slits 57 and 61 automatically close incident to a reduction of pressure within the container 10 following the complete removal of the material from the apparatus, the container 10 may be recharged with material without any likelihood of such material filtering into the distributor unit 36 where it, in the presence of even minute quantities of moisture, might assume (as in the case of dry or powdered cement) a sufficiently hardened or solidified condition to impair the function of the distributor unit. It is to be additionally observed that should any of the material after being introduced into the container assume (prior to such time as an unloading operation is initiated) the form of a hard or solidified mass overlying, and thus tending to obstruct, any one of the slits 57 and 61 formed in the rubber sheaths 56 and 60, such mass of obstructing material is readily disrupted under the action of air pressure within the distributor unit 36 as will be readily understood when it is taken into account that the sheaths become sufficiently distorted in the vicinity of any obstructed slit thereof to so dislodge the obstructing mass as to insure unimpeded delivery of air from the distributor unit. If it should be found desirable to pass a flowing stream of air through the distributor unit 36 in order to remove, for example, any accumulation of moisture in such distributor unit, the valve 52 in the branch 47' is closed and the valve 51 associated with the pipe fitting 46' is opened, with the result that air, upon opening the valve 49 in the supply pipe 48, is directed through the distributor unit 36 by way of the branch pipe 47 with sufficient force, regardless of whether or not the apparatus is loaded with material, to eject such moisture by way of the blow-out pipe 50.

In view of the foregoing description of the operation of the apparatus shown in Figs. 1 to 4, it is believed that no detail description of the form of apparatus shown in Figs. 5 and 6 is necessary, inasmuch as it will be readily understood that the distributor unit 36' functions in the same manner as the distributor unit 36 of Figs. 1 to 4 inclusive.

Although it is believed the general operation of the form of distributor unit shown in Fig. 7 is apparent, it may be well to point out that when material is introduced into the container 10a the weight of such material distorts the distributor element 75 so that it rests, at least in part, on the metal ring 64'. Such distortion tends, as will be readily understood, to maintain the slits 76 tightly closed, especially at their upper ends, so as to effectively insure against passage of material from the container 10a downwardly through the distributor element 75 when the container is subjected to jarring or other vibratory action tending to cause the material to pack or settle.

In view of the foregoing description of the operation of the apparatus shown in Fig. 7, it is believed that no detailed description of the form of distributor unit shown in Fig. 8 is necessary other than to point out that the distributor element 78 is sufficiently rigid to support the load of material in the absence of a metal ring comparable to that indicated by the numeral 64' in Fig. 7 but yet sufficiently yieldable to undergo such distortion under load as will effectively close the slits 85 in the manner described in connection with the slits 76 of Fig. 7.

Regarding the operation of the form of apparatus shown in Fig. 9, it will be understood that aeration of the material within the container 10c and its pneumatic removal from that container is effected by the distributor unit 36c in identically the same manner as described in connection with the forms of apparatus shown in Figs. 1 to 8 inclusive. It will be observed, however, in connection with the form of distributor unit 36c that delivery of air to the container 10c for the aeration of material therein and for the pneumatic removal of such material is effected by reason of the fact that the material from which the annular ring 94 is formed contains a multiplicity of pores which, in the aggregate, afford a satisfactory path for the delivery of air to the container but are individually sufficiently fine to prevent material from filtering down through the annular ring even though such material may be subjected to pronounced jarring actions such as are effected incident to railway transportation.

Aside from the modifications herein shown and described, it will be understood that various other changes may be made without departing from the spirit of the invention or the scope of the following claims.

What is claimed is:

1. A material-handling apparatus comprising a container adapted for the reception of material to be removed therefrom and having a downwardly extending wall converging toward the axis of the container, a pick-up nozzle disposed within said container and provided with an inlet, said nozzle comprising a bottom-forming unit including a downwardly and outwardly extending wall forming with the first-mentioned wall a relatively narrow channel surrounding said axis and into which material is adapted to move under the action of gravity and a hood-like cowl spaced from and substantially enveloping the second-mentioned wall, a discharge conduit associated with said pick-up nozzle and leading outwardly of said container, and a distributor unit disposed about said axis and arranged to effect delivery of compressed air to said container in the vicinity of said channel.

2. A material-handling apparatus comprising a container adapted for the reception of material to be removed therefrom and having a downwardly extending wall converging toward the axis of the container, a pick-up nozzle disposed within said container and provided with an inlet, said nozzle comprising a bottom-forming unit including a downwardly and outwardly extending wall forming with the first-mentioned wall a relatively narrow channel surrounding said axis and into which material is adapted to move under the action of gravity and a hood-like cowl spaced from and substantially enveloping the second-mentioned wall, a discharge conduit associated with said pick-up nozzle and leading outwardly of said container, and a distributor unit disposed about said axis and arranged to effect delivery of compressed air to said container in the vicinity of said channel, said distributor unit having therein a multiplicity of passages by way of which compressed air passes from that unit into said container.

3. In a material-handling apparatus, a container, downwardly-facing discharge means open at its bottom and adapted to receive material from the container, said receiving means having side walls defining with a portion of the side walls of said container a substantially annular channel, and a substantially annular gaseous-fluid discharge conduit for ejecting air into a portion of said annular channel in the vicinity of said receiving means to loosen the material therein and carry it into said receiving means, said conduit including a body of elastic material having therein a multiplicity of slits, said slits being normally closed and said elastic material being distensible incident to the delivery of compressed gaseous fluid to said conduit whereby said slits are spread to provide exit passages for said gaseous fluid.

4. In a material-handling apparatus, a container, downwardly-facing discharge means open at its bottom and adapted to receive material from the container, said receiving means having side walls defining with a portion of the side walls of said container a substantially annular channel, and a substantially annular gaseous-fluid discharge conduit for ejecting air into a portion of said annular channel in the vicinity of said receiving means to loosen the material therein and carry it into said receiving means, said conduit including a body of elastic material having therein a multiplicity of slits provided generally throughout the annular extent of said conduit, each of said slits extending substantially perpendicular to a radius of said annular channel, said slits being normally closed and said elastic material being distensible incident to the delivery of compressed gaseous fluid to said conduit whereby said slits are spread to provide exit passages for said gaseous fluid.

5. In a material-handling apparatus, a container, downwardly-facing discharge means open at its bottom and adapted to receive material from the container, said receiving means having side walls defining with a portion of the side walls of said container a substantially annular channel, and a substantially annular gaseous-fluid discharge conduit for ejecting air into a portion of said annular channel in the vicinity of said receiving means to loosen the material therein and carry it into said receiving means, said conduit including a body of elastic material having therein a multiplicity of slits, said slits being normally closed and said elastic material being distensible incident to the delivery of compressed gaseous fluid to said conduit whereby said slits are spread to provide exit passages for said gaseous fluid, said body being hollow and substantially circular in cross section.

6. In a material-handling apparatus, a container, downwardly-facing discharge means open at its bottom and adapted to receive material from the container, said receiving means having side walls defining with a portion of the side walls of said container a substantially annular channel, and a substantially annular gaseous-fluid discharge conduit for ejecting air into a portion of said annular channel in the vicinity of said receiving means to loosen the material therein and carry it into said receiving means, said conduit including an annular wall provided with a multiplicity of passages by way of which compressed air may pass from said air duct and a body of elastic material associated with said annular wall and having therein a multiplicity of slits through which compressed air passing from said conduit may be delivered to said channel, said slits being normally closed and said elastic material being distensible incident to the delivery of compressed gaseous fluid to said conduit whereby said slits are spread to provide exit passages for said gaseous fluid.

7. In a material-handling apparatus, a container, downwardly-facing discharge means open at its bottom and adapted to receive material from the container, said receiving means having side walls defining with a portion of the side walls of said container a substantially annular channel, and a substantially annular gaseous-fluid discharge conduit for ejecting air into a portion of said annular channel in the vicinity of said receiving means to loosen the material therein and carry it into said receiving means, said conduit including an annular wall provided with a multiplicity of passages by way of which compressed air may pass from said air duct and a body of elastic material associated with said annular wall and having therein a multiplicity of slits through which compressed air passing from said conduit may be delivered to said channel, said slits being normally closed and said elastic material being distensible incident to the delievery of compressed gaseous fluid to said conduit whereby said slits are spread to provide exit passages for said gaseous fluid, said elastic material normally serving to close said passages.

8. In a material-handling apparatus, a container, downwardly-facing discharge means open at its bottom and adapted to receive material from the container, said receiving means having side walls defining with a portion of the side walls of said container a substantially annular channel, and a substantially annular gaseous-fluid discharge conduit for ejecting air into a portion of said annular channel in the vicinity of said receiving means to loosen the material therein and carry it into said receiving means, said conduit comprising an inner tube having a multiplicity of passages therein and a sheath of elastic material having therein a multiplicity of slits, said slits being normally closed and said elastic material being distensible incident to the delivery of compressed gaseous fluid through said passages whereby said slits are spread to provide exit passages for said gaseous fluid.

9. In a material-handling apparatus, a container, downwardly-facing discharge means open at its bottom and adapted to receive material from the container, said receiving means having side walls defining with a portion of the side walls of said container a substantially annular channel, and a substantially annular gaseous-fluid discharge conduit for ejecting air into a portion of said annular channel in the vicinity of said receiving means to loosen the material therein and carry it into said receiving means, said conduit comprising an inner tube having a multiplicity of passages therein and a sheath of elastic material having therein a multiplicity of slits, said slits being normally closed and said elastic material being distensible incident to the delivery of compressed gaseous fluid through said passages whereby said slits are spread to provide exit passages for said gaseous fluid, said slits being in registration with said passages.

10. In a material-handling apparatus, a container, downwardly-facing discharge means open at its bottom and adapted to receive material from the container, said receiving means having side walls defining with a portion of the side walls of said container a substantially annular channel, and a substantially annular gaseous-fluid discharge conduit for ejecting air into a portion of said annular channel in the vicinity of said receiving means to loosen the material therein and carry it into said receiving means, said conduit including a body of elastic material having therein a multiplicity of slits, said slits being normally closed and said elastic material being distensible incident to the delivery of compressed gaseous fluid to said conduit whereby said slits are spread to provide exit passages for said gaseous fluid, said body being in the form of an annular sheet.

11. In a material-handling apparatus, a container, downwardly-facing discharge means open at its bottom and adapted to receive material from the container, said receiving means having side walls defining with a portion of the side walls of said container a substantially annular channel, and a substantially annular gaseous-fluid discharge conduit for ejecting air into a portion of said annular channel in the vicinity of said receiving means to loosen the material therein and carry it into said receiving means, said conduit including an annular plate of substantially rigid material having a multiplicity of passages therein and an annular sheet of elastic material disposed between said plate and said portion of said channel and having therein a multiplicity of slits, said slits being normally closed and said elastic material being distensible incident to the delivery of compressed gaseous fluid to said conduit whereby said slits are spread to provide exit passages for said gaseous fluid.

EVELYN G. ROBINSON.